(12) United States Patent
Peng

(10) Patent No.: US 7,792,402 B2
(45) Date of Patent: Sep. 7, 2010

(54) APPARATUS AND METHOD FOR COUPLING LIGHT TO A THIN FILM OPTICAL WAVEGUIDE

(75) Inventor: Chubing Peng, Allison Park, PA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 12/197,336

(22) Filed: Aug. 25, 2008

(65) Prior Publication Data
US 2010/0046889 A1    Feb. 25, 2010

(51) Int. Cl.
G02B 6/34 (2006.01)
G02B 6/00 (2006.01)
G02B 6/12 (2006.01)
G02B 6/26 (2006.01)
G02B 6/10 (2006.01)
G11B 7/00 (2006.01)
G11B 7/20 (2006.01)
G11B 7/135 (2006.01)

(52) U.S. Cl. .............................. 385/37; 385/10; 385/12; 385/14; 385/31; 385/36; 385/50; 385/129; 385/130; 385/131; 385/132; 369/44.11; 369/44.14; 369/44.17; 369/44.19; 369/94; 369/112.01; 369/112.27; 369/112.29; 369/113.32

(58) Field of Classification Search .................. 385/10, 385/12, 14, 31, 36, 37, 50, 88, 92, 129–132; 369/44.11, 44.14, 44.17, 44.19
See application file for complete search history.

(56) References Cited

U.S. PATENT DOCUMENTS

| | | | |
|---|---|---|---|
| 5,315,676 A | 5/1994 | Sunagawa | |
| 5,418,871 A * | 5/1995 | Revelli et al. | 385/44 |
| 5,420,947 A | 5/1995 | Li et al. | |
| 5,623,561 A | 4/1997 | Hartman | |
| 5,675,691 A | 10/1997 | Edlinger et al. | |
| 5,805,750 A | 9/1998 | Bates | |
| 6,218,194 B1 | 4/2001 | Lyndin et al. | |
| 6,522,812 B1 | 2/2003 | Nikonov | |
| 6,891,685 B2 * | 5/2005 | Deliwala et al. | 359/831 |
| 6,944,112 B2 | 9/2005 | Challener | |
| 2004/0062503 A1 | 4/2004 | Challener | |
| 2005/0111309 A1 | 5/2005 | Peng | |
| 2006/0008206 A1 * | 1/2006 | Maisenhoelder et al. | 385/37 |

OTHER PUBLICATIONS

U.S. Appl. No. 11/485,737, filed Jul. 13, 2006, Rausch et al.

* cited by examiner

Primary Examiner—Charlie Peng
Assistant Examiner—Hung Lam
(74) Attorney, Agent, or Firm—Robert P. Lenart, Esq.; Pietragallo Gordon Alfano Bosick & Raspanti, LLP

(57) ABSTRACT

An apparatus comprises an optical waveguide, a grating for coupling light into the waveguide, and an optical element for splitting a light beam into a plurality of beams that strike the grating at different angles of incidence.

16 Claims, 6 Drawing Sheets

APPARATUS AND METHOD FOR COUPLING LIGHT TO A THIN FILM OPTICAL WAVEGUIDE

This invention was made with United States Government support under Agreement No. 70NANB1H3056 awarded by the National Institute of Standards and Technology (NIST). The United States Government has certain rights in the invention.

BACKGROUND

This invention relates to optical waveguides, and more particularly to optical waveguides that can be used in optical recording and thermally assisted magnetic recording. Heat assisted magnetic recording (HAMR) generally refers to the concept of locally heating a recording medium to reduce the coercivity of the recording medium so that an applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability.

Heat assisted magnetic recording requires an efficient technique for delivering large amounts of light power to the recording medium confined to spots of, for example, 50 nm or less. Recent designs of HAMR recording heads include a thin film waveguide on an AlTiC slider to guide light to a storage medium for localized heating of the storage medium. To launch light into the waveguide, a grating coupler can be used. Due to the limited size of the slider, the size of the incident beam is only ~50 μm. At this beam size and with conventional symmetric surface corrugation grating couplers, coupling efficiency from the incident beam to the waveguide is low (<20%).

In thermally assisted magnetic recording, information bits are recorded on a storage layer at elevated temperatures, and the heating area in the storage layer determines the data bit dimension. In one approach, a beam of light is condensed to a small optical spot onto the recorded media by a solid immersion mirror fabricated on a planar waveguide. In this approach, light is coupled into the waveguide by a diffraction grating, which is optimized to yield good coupling efficiency for a given incident beam. The range of angle of incidence at the half maximum of coupling efficiency is less than 0.7° for an incident Gaussian beam of 50 μm. With such a low acceptance angle of incidence, it is difficult to achieve a high coupling efficiency in a practical HAMR slider.

There is a need for an apparatus that provides an increased acceptance angle of incidence to improve the efficiency of coupling an electromagnetic wave into a waveguide.

SUMMARY

In one aspect, this invention provides an apparatus comprising an optical waveguide, a grating for coupling light into the waveguide, and an optical element for splitting a light beam into a plurality of beams that strike the grating at different angles of incidence.

In another aspect, the invention provides an apparatus comprising an optical waveguide including a core layer, a first grating positioned adjacent to a first side of the core layer for coupling light into the waveguide, and a second grating positioned adjacent to a second side of the core layer for coupling light into the waveguide, wherein the first and second grating differ in groove period, duty cycle, and/or groove depth.

In another aspect, the invention provides an apparatus comprising an optical waveguide, a grating for coupling light into the waveguide, a light source, and an optical element between the light source and the grating for splitting a light beam into a plurality of beams.

The optical waveguide can comprise a cover layer and a core layer, wherein the grating is positioned along an interface between the cover layer and the core layer.

The optical waveguide can further comprise a cladding layer positioned adjacent to the core layer, and a reflective layer positioned adjacent to the cladding layer.

The grating can be positioned adjacent to a surface of the core layer opposite the cladding layer.

DETAILED DESCRIPTION OF THE INVENTION

Figure 1:
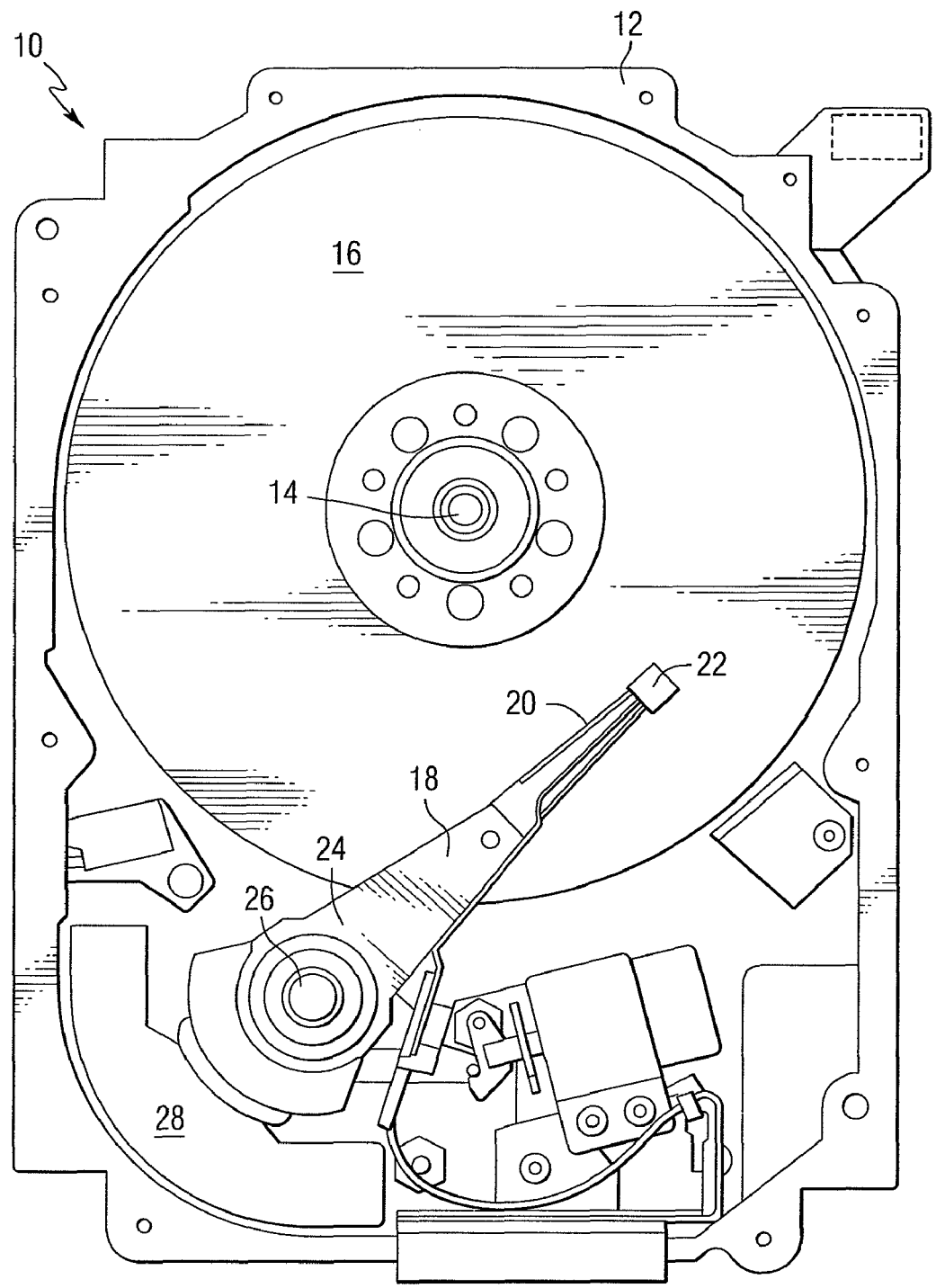
FIG. 1 is a pictorial representation of a magnetic disc drive that can include this invention.

FIG. 1 is a pictorial representation of a disc drive 10 that can utilize recording heads having waveguides constructed in accordance with an embodiment of this invention. The disc drive includes a housing 12, with the upper portion removed and the lower portion visible in this view, sized and configured to contain the various components of the disc drive. The disc drive further includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

In heat assisted magnetic recording, an electromagnetic wave of, for example, visible, infrared or ultraviolet light is directed onto a surface of a data storage medium to raise the temperature of a localized area of the medium to facilitate switching of the magnetization of the area. This invention provides an efficient means of coupling an electromagnetic wave to a planar waveguide, which can be used to direct the electromagnetic wave to the surface of a recording medium.

Figure 2:
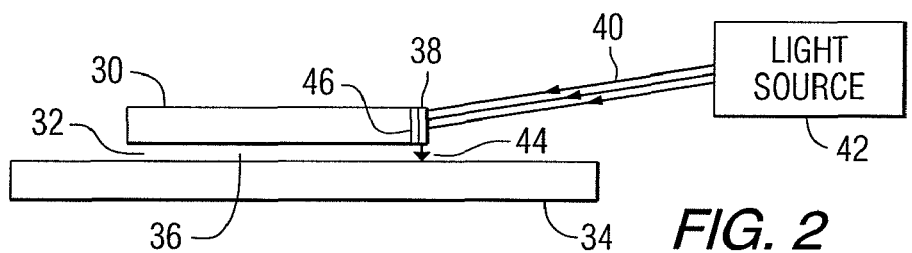
FIG. 2 is a side elevation view of a slider that can include the waveguides of this invention.

FIG. 2 is a side elevation view of a slider 30 that can include a waveguide constructed in accordance with an embodiment of this invention. The slider includes an air bearing surface 32 that is positioned adjacent to a magnetic storage medium in the form of a disc 34. In operation, an air bearing 36 is formed between the spinning disc and the slider to prevent contact between the slider and the disc. A waveguide 38, which can be constructed in accordance with any of the examples described below, is mounted at one end of the slider. Light illustrated by rays 40 is supplied by a light source such as a laser 42, and illuminates the slider where the thin film waveguide is mounted. A portion of the light is coupled into the waveguide by a grating coupler.

Light is coupled into the waveguide from free space, propagates through the waveguide, and is focused onto the data storage medium for heating a localized portion of the medium. The light is directed toward the storage medium as illustrated by arrow 44. If the slider is used in a magneto-optical recording application, a magnetic write pole 46 can be positioned adjacent to the waveguide to provide a magnetic write field.

In the example of FIG. 2, the wave vector $\vec{K}$ of the incident beam has a component directed toward the magnetic disc below the slider. Otherwise, extra optical components would be needed to shine the incident light onto a grating coupler.

Figure 3:
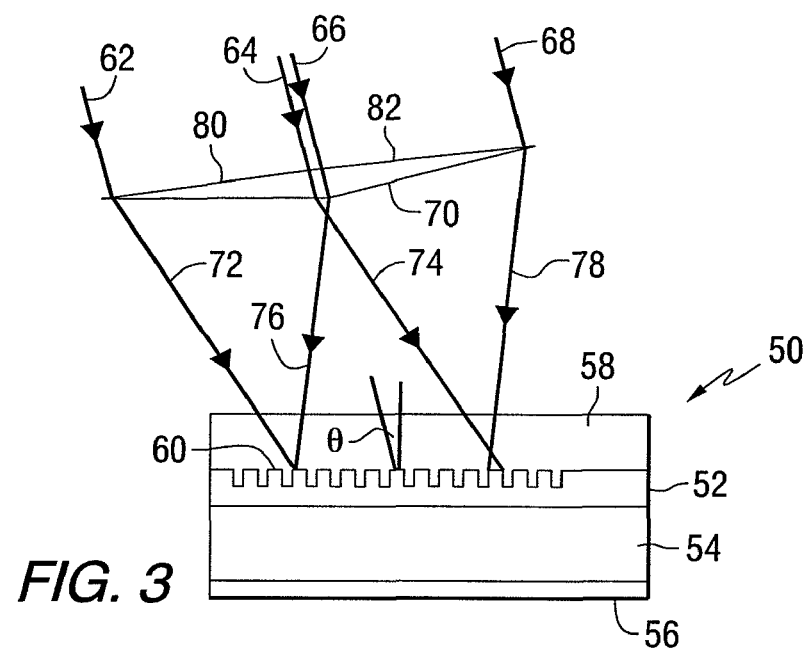
FIG. 3 is a schematic representation of an apparatus constructed in accordance with an embodiment of this invention.

FIG. 3 is a schematic representation of a portion of a waveguide 50 constructed in accordance with this invention. The waveguide includes a core (or guiding) layer 52, a cladding layer 54 adjacent to the core layer, and a highly reflective layer 56 adjacent to the cladding layer. A cover layer 58, which can be air, is positioned adjacent to the core layer. A grating 60 is positioned at the interface between the cover layer and the core layer. Alternatively, the grating can also be placed at the core/cladding layer interface. The grating can be formed, for example, by grooves or ridges adjacent to a surface of the guiding layer. The grooves or ridges can have, for example, a rectangular, sinusoidal, triangular, or saw tooth (blazed) cross-sectional shape.

A coherent source of electromagnetic radiation, such as a laser, produces a polarized beam of light, illustrated by optic rays 62, 64, 66 and 68, that pass through a bi-prism 70. The bi-prism splits the incident beam into two beams, a first beam illustrated by arrows 72 and 74, and a second beam illustrated by arrows 76 and 78. These two beams are directed onto the grating 60. Light that is incident on the grating is coupled into the core layer of the waveguide.

In FIG. 3, the grating coupler is positioned at the interface between the cover layer and the core layer, and is formed by periodic grooves in the guiding layer. This arrangement is referred to as surface corrugation. The groove profiles (cross-sectional shape) in this example are rectangular and oriented perpendicular to the direction of propagation of the light in the guiding layer. Alternatively, the groove profiles can be sinusoidal or other shapes that are known to be used for grating couplers.

FIG. 3 shows an example using a one-dimensional Fresnel bi-prism. The Fresnel bi-prism is formed by two equal prisms 80 and 82 of small refracting angle placed together base-to-base with their refracting edges parallel to each other. The bi-prism is uniform in the direction normal to the plane of the figure. The incident beam is divided by refraction into two overlapping beams, which illuminate the grating coupler to launch light into the waveguide. Angle $\theta_0$ is the angle of incidence on the grating if the bi-prism were absent.

In order to increase the acceptance angle of incidence, the apparatus of FIG. 3 splits the incident beam into multiple beams that travel in different directions and illuminate the grating at different angles of incidence. In one example, every beam covers the full size of the grating coupler. Some of the beams, which strike the grating at the optimized angle of incidence, will be efficiently coupled into the waveguide by the grating. By forming multiple beams that strike the grating at different angles, even if the original beam and/or the prism is misaligned, there is an increased probability that at least one of the beams will strike the grating at the optimal angle of incidence.

Figure 4:
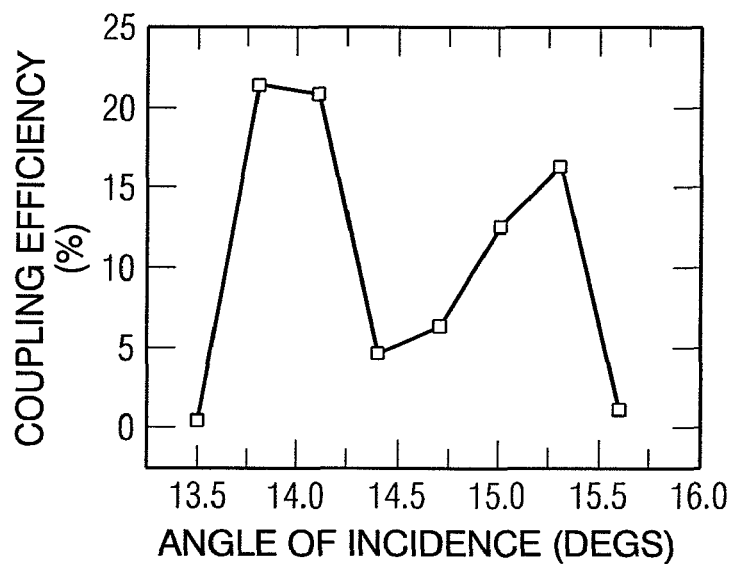
FIG. 4 is a graph of calculated coupling efficiency versus angle of incidence for the apparatus of FIG. 4.

To evaluate the performance of this illumination method, the input coupling efficiency versus the angle of incidence has been calculated. The incident Gaussian beam was assumed to have a diameter of 2×50 µm at its beam waist. The two split beams were assumed to overlap by approximately 50 µm, which was the width of the input grating coupler. The light wavelength was assumed to be 488 nm. The waveguide included an $AlO_3$ cover layer, an 80 nm thick $Ta_2O_5$ core layer, a 460 nm thick $AlO_3$ cladding layer, and an Al mirror layer for enhancing the coupling efficiency. The input grating coupler was assumed to be etched at the interface between the cover layer and the core layer. The groove profile was assumed to be rectangular, having a grating period of 320 nm and a depth of 30 nm. The refractive index of the $Al_2O_3$ layer is 1.67 and that of the $Ta_2O_5$ layer is 2.22. The angle of the bi-prism was chosen to be 1°. FIG. 4 shows the computed coupling efficiency versus the angle of incidence. It is seen that the coupling efficiency has two pronounced peaks, separated by ~1.3°. In this example, the prism angle is slightly too large and the coupling efficiency at the middle of the two peaks falls below half of the maximum efficiency.

While the apparatus of FIG. 3 uses a Fresnel bi-prism for the optical element that splits the incident beam, other optical elements could be used, such as a Fresnel mirror, or an optical holographic element.

Figure 5:
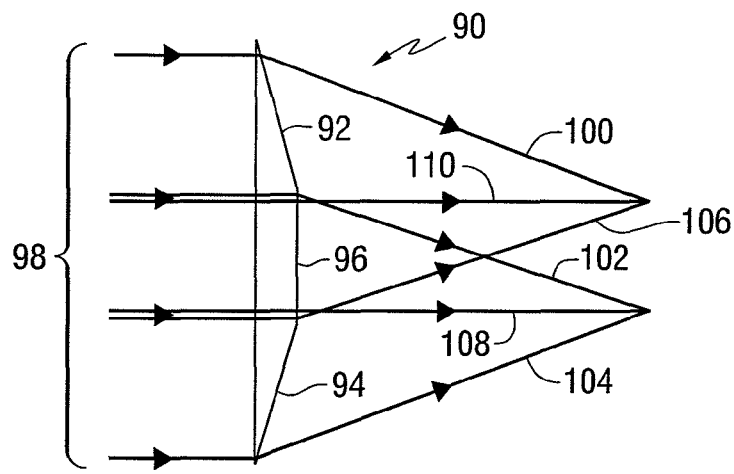
FIG. 5 is a side view of a modified prism.

One way to improve the design is to modify the bi-prism into a prism having a flat middle, as shown in FIG. 5. The prism 90 of FIG. 5 is a modified Fresnel bi-prism that includes a first prism 92, a second prism 94, and a rectangular section 96 being positioned between the two prisms. The prism of FIG. 5 splits the incident beam 98 into three beams, differing in propagation direction. These three beams can be used to illuminate a grating coupler. Arrows 100 and 102 represent a first one of the beams, arrows 104 and 106 represent a second one of the beams, and arrows 108 and 110 represent a third one of the beams. In this design, the coupling efficiency curve should be flat. It will allow about a 2° tolerance in the incident beam if the prism angle is 1°.

Figure 6:
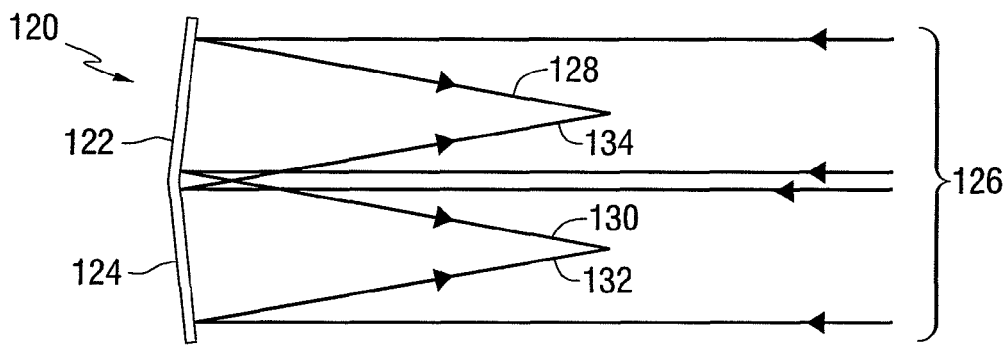
FIG. 6 is a side view of a mirror.

The above designs use refraction to form the multiple beams. Alternatively, a reflective element can be used to fulfill the same purpose. One example, shown in FIG. 6, uses a Fresnel mirror 120 to provide the beam splitting and recombining function. The mirror includes two sections 122 and 124. An incident beam 126 is reflected by the mirror sections and split into two beams that propagate in different directions. Arrows 128 and 130 represent a first one of the beams, and arrows 132 and 134 represent a second one of the beams. The grating would be placed near the overlap region of the two beams.

Figure 7:
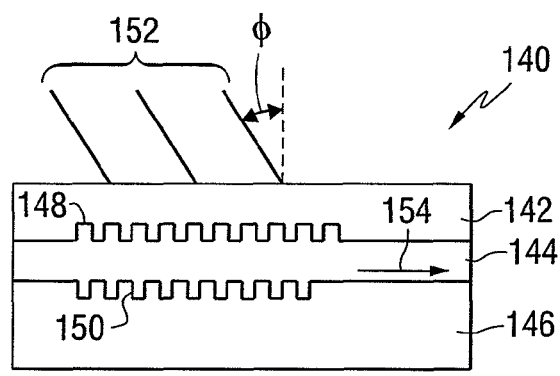
FIG. 7 is a side elevation view of a waveguide in accordance with another embodiment of this invention.

In another aspect, the invention encompasses apparatus that includes double corrugations to launch light into a planar waveguide, as shown in FIG. 7. FIG. 7 shows a waveguide 140 comprising a cover layer 142, a core layer 144, and a cladding layer 146. A first grating 148 is at the cover-core interface and a second grating 150 is at the cladding-core interface. An incident beam 152 strikes the waveguide at an angle of incidence of φ. The two gratings differ slightly in the groove period, duty cycle, and/or groove depth such that the resonant angle for launching light by each grating differs by an amount approximately equal to the full-width-at-half-maximum angular width of the coupling efficiency of each grating. The fall-width-at-half-maximum angular width of the coupling efficiency is defined as the range of incident angle bounded by points where the coupling efficiency drops to 50%.

FIG. 7 shows an input grating coupler including double corrugations for launching light into a planar waveguide. Each grating is characterized by a groove period p, a depth d, and a duly cycle. The relative displacement, s, of the two gratings is measured in the direction of propagation of the light in the core layer as illustrated by arrow 154.

To evaluate the performance of the input grating coupler of FIG. 7, the input coupling efficiency versus the angle of incidence has been calculated. The incident beam was considered to be Gaussian, having a $1/e^2$ intensity diameter of 25 µm at its beam waist. The light wavelength was assumed to be 488 µm. The waveguide included an 80 nm thick $Ta_2O_5$ core layer sandwiched between an $Al_2O_3$ cover layer and an $Al_2O_3$ cladding layer. The refractive index of the $Ta_2O_5$ layer was 2.12 and that of the $Al_2O_3$ layer was 1.67.

The simulated grating was assumed to have a rectangular groove profile. Both gratings were assumed to have groove depth d=30 nm and a 50% duty cycle. The grating at the cover-core interface was assumed to have a groove period $p_1$=320 nm, and the grating at the cladding-core interface was assumed to have a groove period $P_2$=325 nm. In this simulation, there was no relative displacement between two gratings, i.e., s=0 in FIG. 7.

Figure 8:
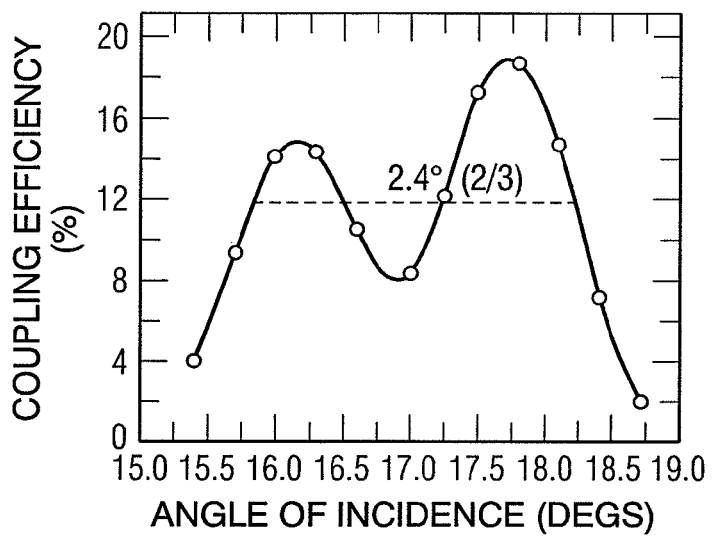
FIGS. 8, 9 and 10 are graphs of calculated coupling efficiency versus angle of incidence for the apparatus of FIG. 7.

FIG. 8 shows the computed grating coupling efficiency versus angle of incidence for the waveguide of FIG. 7. In this example, except for the groove period, which differs by 5 nm, the two gratings are identical. The relative displacement between the two gratings was s=0. There was no mirror in the waveguide for enhancing the coupling efficiency. From FIG. 8, it is seen that the coupling efficiency has two distinct peaks, separated by ~1.6°. At the ⅔ coupling efficiency, the full angular width is 2.4°, as marked in FIG. 8. The coupling efficiency at the middle angle of incidence can be improved by reducing the difference between the periods of the two gratings.

Figure 9:
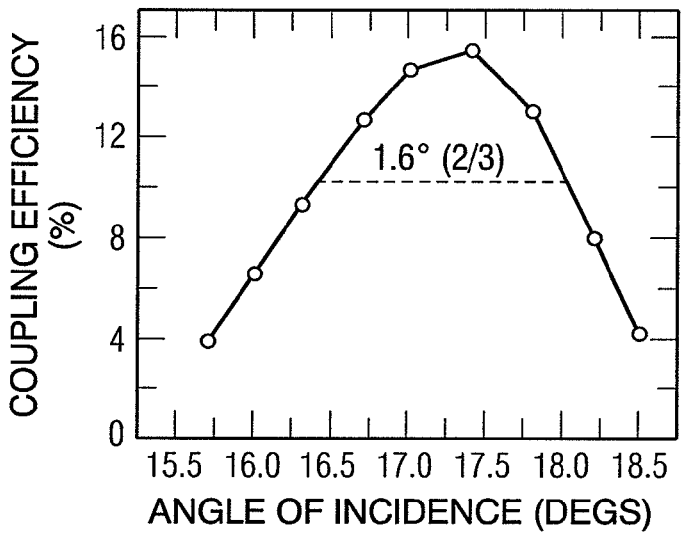

The shape of the coupling efficiency versus the angle of incidence curve can be modified by shifting the positions of the two gratings with respect to each other. FIG. 9 shows simulation results for a case having a displacement of s=160 nm, which corresponds to a π phase difference between the radiated beams from the two gratings. It is interesting to see that the valley between two peaks in FIG. 8 disappears and the two peaks collapse into a single maximum. The full angular width at the ⅔ intensity level is ~1.6°.

Figure 10:
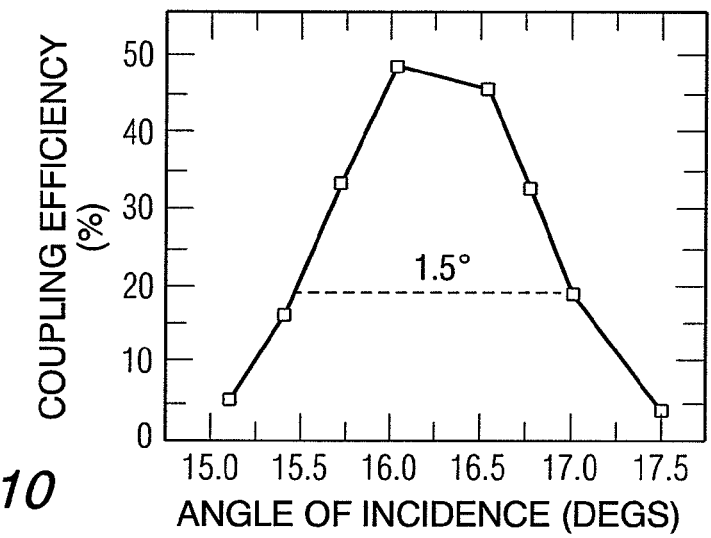

To improve the coupling efficiency, a mirror layer could be placed behind the cladding layer. FIG. 10 shows the computed coupling efficiency vs. the angle of incidence with a mirror placed behind the cladding layer. The cladding layer was 420 nm thick. Compared to FIG. 9, the peak coupling efficiency is doubled with a mirror placed behind the cladding layer. At the 20% coupling efficiency point, the FWHM (full-width-at-half-maximum efficiency) angular width is ~1.50.

Figure 11:
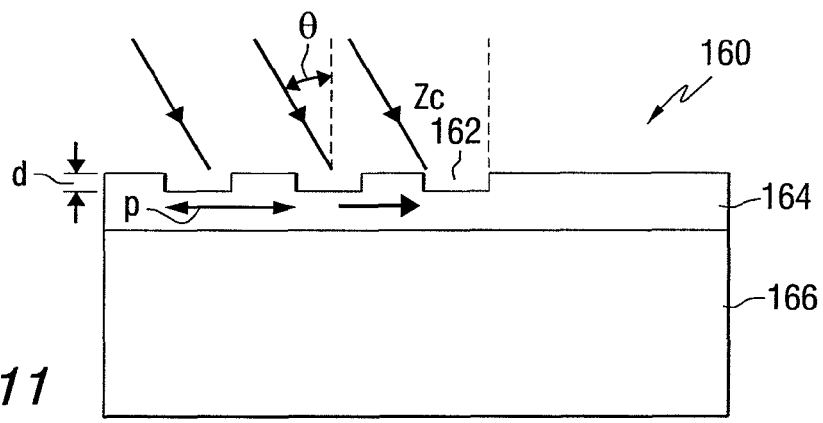
FIG. 11 is a side elevation view of a waveguide in accordance with another embodiment of this invention.

In another aspect, the invention provides a grating coupler having a limited number of pitches. For a uniform grating coupler, the number of pitches in the grating coupler and the depth of the grooves determine the acceptance angle of incidence. To achieve greater acceptance angle of incidence, a limited number of pitches can be used in the grating coupler. To match the grating coupler length, the beam size is correspondingly reduced. For a narrow incident Gaussian beam, the groove required for efficient coupling is also deep, which further increases the acceptance angle of incidence. To see the dependence of acceptance angle of incidence on the length of an input grating coupler, the coupling efficiency versus the angle of incidence for the waveguide of FIG. 11 has been computed. FIG. 11 shows a planar waveguide 160 with an input grating coupler 162. The waveguide includes a $Ta_2O_5$ core layer 164 on a $SiO_2$ substrate 166. The grating is characterized by groove period p, depth d, and duty cycle. $Z_c$ denotes the distance of the incident beam center from the edge of groove.

Figure 12:
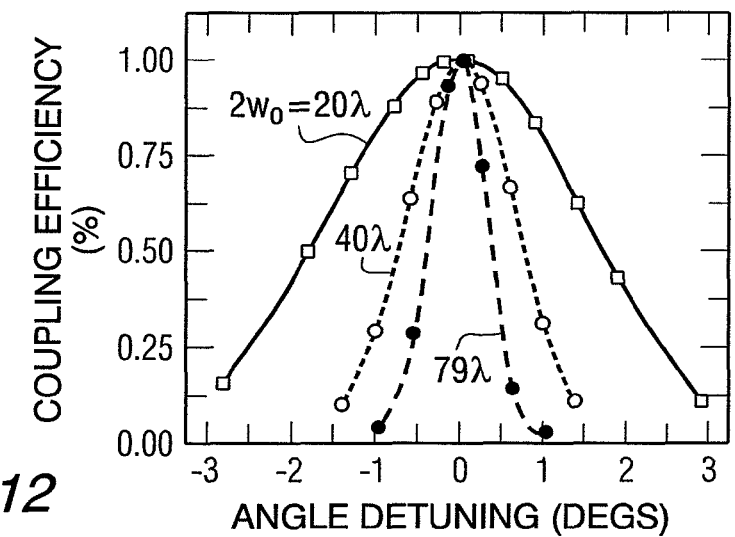
FIG. 12 is a graph of calculated coupling efficiency versus angle detuning for the apparatus of FIG. 11.

In the waveguide of FIG. 11, a uniform grating is etched at the surface of the core layer for coupling light from free space into the waveguide. For this simulation the refractive index of the core was n=2.09 and that of substrate was n=1.47. The thickness of core layer was assumed to be 100 nm. The light wavelength was assumed to be λ=0.63 µm. The grating period was p=0.36 µm. FIG. 12 shows the computed relative coupling efficiency versus angle of incidence from its optimum. $W_o$ denotes the radius of the beam at a $1/e^2$ intensity. For each $w_o$, the groove depth is optimized to yield the best coupling efficiency. The FWHM angular width is 0.79° for $2w_o$=79 λ; 1.51° for $2w_o$=40 λ; and 3.51° for $2w_o$=20 λ.

Figure 13:
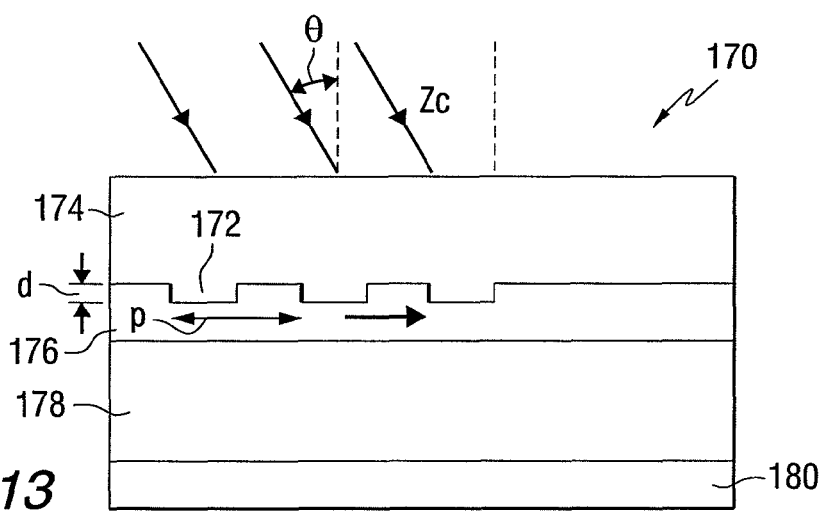
FIG. 13 is a side elevation view of a waveguide in accordance with another embodiment of this invention.

FIG. 13 shows a waveguide 170 with a grating coupler 172. The waveguide includes an $Al_2O_3$ cover layer 174, a $Ta_2O_5$ core layer 176, an $Al_2O_3$ cladding layer 178, and an Al mirror layer 180. The grating is characterized by a groove period p, a depth d, and a duty cycle. $Z_c$ denotes the distance of the beam center from the edge of the groove.

To enhance the coupling efficiency, the Al layer 180 is integrated in the waveguide. The thickness of the cladding layer between the core and the Al layer is optimized to yield good coupling efficiency. To evaluate the performance of a grating coupler having a limited number of pitches, an incident beam of $1/e^2$ intensity diameter $2w_o$=20 λ can be used. The light wavelength was λ=0.410 µm. The grating period was p=0.26 µm, and the grating had a 50% duty cycle. The grating has only 38 pitches (=9.88 µm) in this example. The waveguide comprised an 80 µm thick $Ta_2O_5$ core layer sandwiched between an $Al_2O_3$ cover layer, and an $Al_2O_3$ cladding layer. The refractive index of the $Ta_2O_5$ layer was n=2.20 and that of the $Al_2O_3$ layer was n=1.66.

Figure 14:
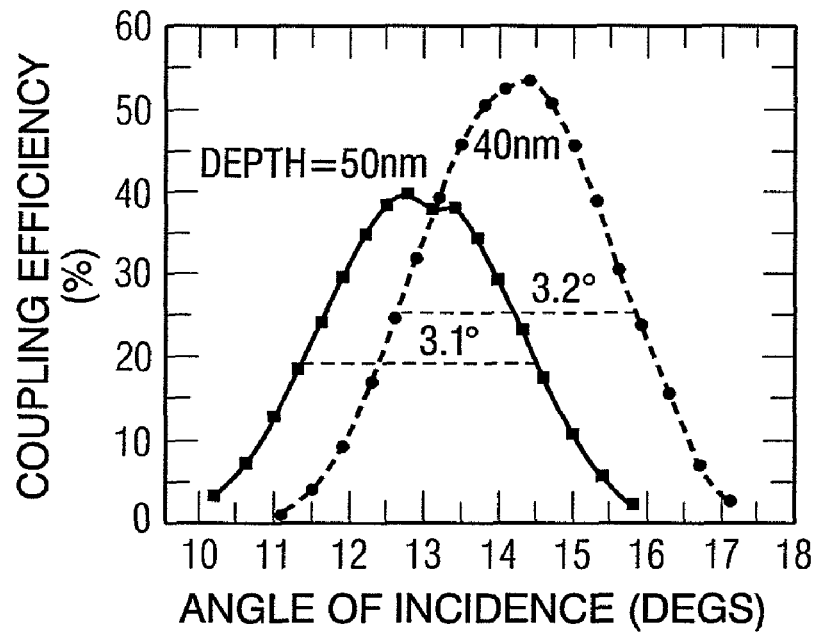
FIG. 14 is a graph of calculated coupling efficiency versus angle of incidence for the apparatus of FIG. 13.

FIG. 14 shows the computed coupling efficiency as a function of angle of incidence. In this simulation, the thickness of the cladding layer was fixed at 460 nm. It is seen that at the groove depth of d=40 nm, peak coupling efficiency reaches ~55% and the FWHM angular width is about 3.2°, which covers the requirement for practical application.

Figure 15:
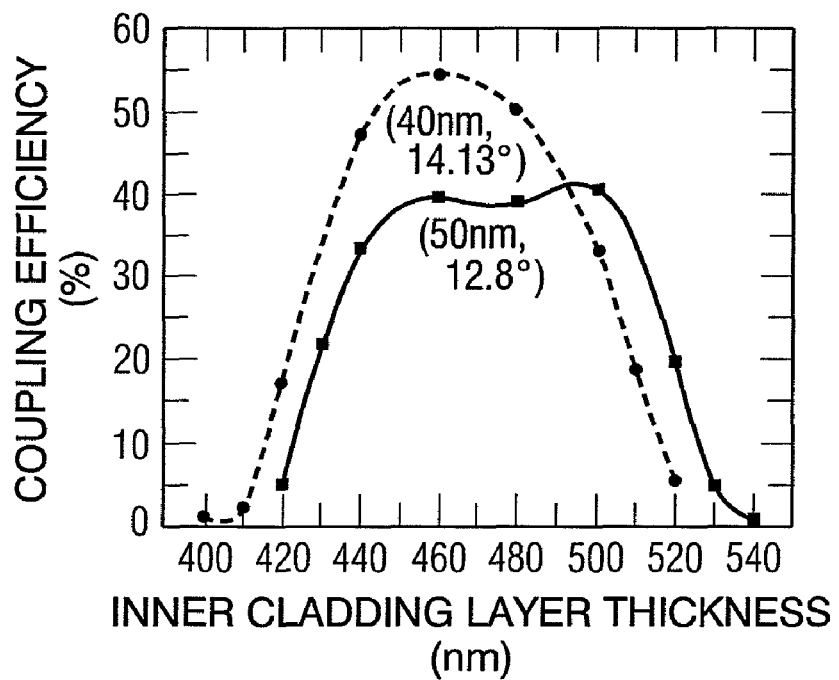
FIG. 15 is a graph of calculated coupling efficiency versus inner cladding layer thickness for the apparatus of FIG. 13.

FIG. 13 shows a symmetric waveguide and uniform grating coupler. FIG. 14 shows the computed coupling efficiency versus angle of incidence for groove depths of d=40 nm and 50 nm. FIG. 15 shows the computed coupling efficiency versus the thickness of cladding layer. It is seen that the tolerance of the cladding layer is ~60 nm.

For greater coupling efficiency, a grating of variable groove depth and/or duty cycle may be used. Optimization using a genetic algorithm showed that a 60% peak efficiency could be obtained by varying the duty cycle in the grating coupler. To increase coupling efficiency, a highly reflective layer/mask, called a mirror, can be used to reflect the beam transmitted through the grating and waveguide back into the grating region.

The waveguides of this invention can be used in magneto-optical recording heads, and/or in optical recording applications in which a magnetic field is not needed, such as write once and phase change recording, or where an external magnet could be positioned below the substrate, such as in magneto-optical recording. Alternatively, these structures could potentially be useful in a probe storage application or any other application in which light is coupled into a waveguide.

While the invention has been described in terms of several examples, it will be apparent to those skilled in the art that various changes can be made to the disclosed examples, without departing from the scope of the invention as set forth in the following claims.

What is claimed is:

1. An apparatus comprising:
    an optical waveguide including a core layer and a cover layer adjacent to the core layer;
    a grating positioned at an interface between the core layer and the cover layer for coupling light into the waveguide; and
    an optical element for splitting a light beam into a plurality of overlapping beams that strike the grating at different angles of incidence, wherein the light beams are coupled into the core layer of the optical waveguide.

2. The apparatus of claim 1, wherein an optical element comprises:
    a bi-prism, a mirror, or a holographic element.

3. The apparatus of claim 1, wherein an optical waveguide further comprises:
    a cladding layer positioned adjacent to the core layer; and
    a reflective layer positioned adjacent to the cladding layer.

4. The apparatus of claim 3, wherein the grating is positioned adjacent to a surface of the core layer opposite the cladding layer.

5. The apparatus of claim 1, wherein the grating comprises a plurality of grooves or ridges in the core layer.

6. The apparatus of claim 5, wherein the grooves or ridges have a rectangular, sinusoidal, triangular, or saw tooth cross-sectional shape.

7. An apparatus comprising:
    an optical waveguide including a core layer;
    a first input grating positioned adjacent to a first side of the core layer;
    a second input grating positioned adjacent to a second side of the core layer, wherein first and second input gratings are displaced with respect to each other in a direction parallel to a direction that the light passes through the core layer; and
    a light source for directing light onto the first and second gratings, wherein the light strikes the input gratings at the same time and the light is coupled into the core layer.

8. The apparatus of claim 7, wherein the first and second input gratings differ in at least one of a groove period, duty cycle, or groove depth.

9. The apparatus of claim 7, wherein an optical waveguide further comprises:
    a cover layer positioned adjacent to the first side of the core guiding layer; and
    a cladding layer positioned adjacent to the second side of the core guiding layer.

10. The apparatus of claim 9, wherein an optical waveguide further comprises:
    a reflective layer positioned adjacent to the cladding layer.

11. The apparatus of claim 7, wherein each of the first and second gratings comprises a plurality of grooves or ridges in the core layer.

12. The apparatus of claim 11, wherein the grooves or ridges have a rectangular, sinusoidal, triangular, or saw tooth cross-sectional shape.

13. An apparatus comprising:
    an optical waveguide including a core layer and a cover layer adjacent to the core layer;
    a grating positioned at an interface between the core layer and the cover layer for coupling light into the waveguide;
    a light source; and
    an optical element between the light source and the grating for splitting a light beam into a plurality of beams, wherein the plurality of overlapping beams strike the grating at different angles of incidence, and the plurality of light beams are coupled into the core layer of the optical waveguide.

14. The apparatus of claim 13, wherein an optical element comprises:
    a bi-prism, a mirror, or a holographic element.

15. The apparatus of claim 14, wherein an optical waveguide further comprises:
    a cladding layer positioned adjacent to the core layer; and
    a reflective layer positioned adjacent to the cladding layer.

16. The apparatus of claim 15, wherein the grating is positioned adjacent to a surface of the core layer opposite the cladding layer.

* * * * *